United States Patent
Yan et al.

(10) Patent No.: US 8,086,007 B2
(45) Date of Patent: Dec. 27, 2011

(54) METHOD AND SYSTEM FOR HUMAN VISION MODEL GUIDED MEDICAL IMAGE QUALITY ASSESSMENT

(75) Inventors: Michelle Xiao-Hong Yan, Princeton, NJ (US); Ti-chiun Chang, Princeton Junction, NJ (US); Markus Lendl, Ottensoos (DE); Stefan Boehm, Oberasbach (DE); Tong Fang, Morganville, NJ (US); Peter Durlak, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 656 days.

(21) Appl. No.: 12/286,970

(22) Filed: Oct. 3, 2008

(65) Prior Publication Data
US 2009/0116713 A1 May 7, 2009

Related U.S. Application Data

(60) Provisional application No. 60/980,864, filed on Oct. 18, 2007.

(51) Int. Cl.
*G06K 9/00* (2006.01)
(52) U.S. Cl. ........ 382/128; 382/173; 382/195; 382/199; 382/203
(58) Field of Classification Search .................. 382/128, 382/173, 195, 199, 203
See application file for complete search history.

(56) References Cited

U.S. PATENT DOCUMENTS

| | | | |
|---|---|---|---|
| 6,285,797 B1 | 9/2001 | Lubin et al. | |
| 6,775,399 B1 * | 8/2004 | Jiang | 382/128 |
| 7,090,640 B2 * | 8/2006 | Barth et al. | 600/443 |
| 2005/0089246 A1 | 4/2005 | Luo | |
| 2006/0274618 A1 | 12/2006 | Bourret | |
| 2008/0063063 A1 * | 3/2008 | Gelderblom et al. | 375/240.16 |
| 2008/0207198 A1 | 8/2008 | Juric | |
| 2008/0226148 A1 | 9/2008 | Gu et al. | |

OTHER PUBLICATIONS

Ferzli, Rony, et al., "Human Visual System Based No-Reference Objective Image Sharpness Metric", IEEE Int'l Conf. on Image Processing, pp. 2949-2952, Oct. 2006.
Shaked, Doron, et al., "Sharpness Measure: Towards Automatic Image Enhancement", HP Laboratories Israel, Jun. 2005.

* cited by examiner

*Primary Examiner* — Wai Sing Louie (57) ABSTRACT

A method and system for image quality assessment is disclosed. The image quality assessment method is a no-reference method for objectively assessing the quality of medical images. This method is guided by the human vision model in order to accurately reflect human perception. A region of interest (ROI) of medical image is divided into non-overlapping blocks of equal size. Each of the blocks is categorized as a smooth block, a texture block, or an edge block. A perceptual sharpness measure, which is weighted by local contrast, is calculated for each of the edge blocks. A perceptual noise level measure, which is weighted by background luminance, is calculated for each of the smooth blocks. A sharpness quality index is determined based on the perceptual sharpness measures of all of the edge blocks, and a noise level quality index is determined based on the perceptual noise level measures of all of the smooth blocks. An overall image quality index can be determined by using task specific machine learning of samples of annotated images. The image quality assessment method can be used in applications, such as video/image compression and storage in healthcare and homeland security, and band-width limited wireless communication.

15 Claims, 11 Drawing Sheets

METHOD AND SYSTEM FOR HUMAN VISION MODEL GUIDED MEDICAL IMAGE QUALITY ASSESSMENT

This application claims the benefit of U.S. Provisional Application No. 60/980,864, filed Oct. 18, 2007, the disclosure of which is herein incorporated by reference.

BACKGROUND OF THE INVENTION

The present invention relates to image quality assessment, and more particularly, to human vision model guided image quality assessment in medical images.

Image quality assessment is an important and challenging problem in image processing. With the rapid advancements of digital image processing, the demand of objective image quality assessment is very high. For example, for image compression, an objective image quality metric that measures the quality of a compressed image can be used to find the best compromise between the rate and distortion in the image compression. Image quality evaluation can also be applied to image communication. When transmitting an image progressively, an objective image quality metric can be used to determine if the transmitted image information is good enough, or if more information needs to be transmitted. Furthermore, image quality assessment can also play an important role in image restoration techniques, such as, structure edge enhancement, noise reduction, image de-blurring, etc. Image quality assessment can also be used to automatically determine the optimal parameters for image filters and to provide search directions in optimization algorithms.

Along with the rapid development of radiology and digital medical imaging systems, image processing and analysis techniques have been developed to increase the quality of medical images. An objective measurement of image quality is especially important for medical images, since the quality of a medical image is directly related to the diagnostic accuracy of the medical image. Some techniques for traditional image quality evaluation can be directly applied for medical image quality assessment. However, because of the differences is the users, image formats, and characteristics of image contents in medical images, directly applying existing natural image quality evaluation methods for evaluating the image quality of medical images does not typically provide satisfactory results. The users of medical imaging systems are typically physicians. Unlike general users for natural images, physicians typically focus on particular regions of interest (ROI) in a medical image, and the quality of other regions in the image may be irrelevant for diagnostic accuracy. The formats and characteristics of medical images also make the problem of medical image quality assessment quite different from that of natural images. Most medical images are of high dynamic ranges, i.e., each pixel is represented by more than 8 bits, while only 8-bit intensity can be displayed on typical monitors. These differences need to be considered in the development of a medical image quality assessment method.

Most conventional medical image quality assessment methods were developed for evaluating the quality of compressed medical images based on full-reference quality metrics, i.e., evaluating the difference between the original image and the distorted (compressed) image. However, the original images may not be available or reliable in many situations. For example, parameter tuning of radiographic machines and filter parameter optimization in medical image post-processing can benefit from objective image quality assessment, but the original image information is not available in these applications. Thus, a no-reference objective quality assessment method for medical images is desirable. Furthermore, research has shown that traditional quantitative image quality metrics, such as peak signal to noise ratio (PSNR) and mean squared error (MSE), are not directly related to human perception. Thus, an objective quality assessment method that takes the human vision system (HVS) into account to accurately reflect the human perception of image quality is desirable.

BRIEF SUMMARY OF THE INVENTION

The present invention provides a non-reference medical image quality assessment method that is consistent with human perception of image quality. Embodiments of the present invention calculate objective image quality metrics by combining local contrast, region smoothness, and edge sharpness. Such objective image quality metrics utilize the Just-Noticeable-Difference (JND) concept, so that the image quality measure is consistent human perception. Furthermore, embodiments of the present invention can be used with a particular region of interest (ROI) in a medical image, which is practical for diagnostic purposes.

In one embodiment of the present invention, a region of interest (ROI) of medical image is divided into multiple blocks. The blocks can be non-overlapping blocks of equal size. Each of the blocks is categorized as a smooth block, a texture block, or an edge block. A perceptual sharpness measure, which is weighted by local contrast, is calculated for each of the edge blocks. A perceptual noise level measure, which is weighted by background luminance, is calculated for each of the smooth blocks. A sharpness quality index is determined based on the perceptual sharpness measures of all of the edge blocks, and a noise level quality index is determined based on the perceptual noise level measures of all of the smooth blocks.

These and other advantages of the invention will be apparent to those of ordinary skill in the art by reference to the following detailed description and the accompanying drawings.

DETAILED DESCRIPTION

The present invention relates to a method for medical image quality assessment. Although embodiments of the present invention are described herein using x-ray images, the present invention can be applied to all types of medical images, such as computed tomography (CT), magnetic resonance (MR), ultrasound, etc. Embodiments of the present invention are described herein to give a visual understanding of the medical image quality assessment method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to a no-reference medical image quality assessment method, which measures perceived sharpness and noise levels in medical images, such as x-ray images. By using a human vision system (HVS) model, i.e., the Just-Noticeable-Difference (JND) model, local contrast and background weighting is incorporated into the image quality measures to ensure measured results are consistent with human sensory perception. The image quality assessment method can work with or without prior knowledge regarding locations of regions of interest (ROI), such as regions surrounding a catheter, guide wire, or stent.

Just-Noticeable-Difference (JND) is a basic and important property in HVS. The definition of JND is the minimal difference that an observer can detect, thus any distortion below JND cannot be detected by human eyes. Accordingly, JND describes the relationship between stimulus magnitude and sensory experience. Ernst Heinrich Weber observed that the difference threshold appeared to be lawfully related to the initial stimulus intensity. This relationship, known as Weber's Law, can be expressed as:

$$\frac{\Delta I}{I} = k, \quad (1)$$

where $\Delta I$ represents the change of stimulus, I represents the initial stimulus intensity, and k is the Weber's constant.

Weber's Law declares that the difference threshold is a constant proportion of the original stimulus. For example, suppose that an observer can tell the difference between stimuli of 100 units and 110 units, then Weber's constant k is 0.1. That is, if the given stimulus is 1000 units, then the intensity change must be more than 100 for the observer to be able to discriminate the change in stimulus.

Figure 1:
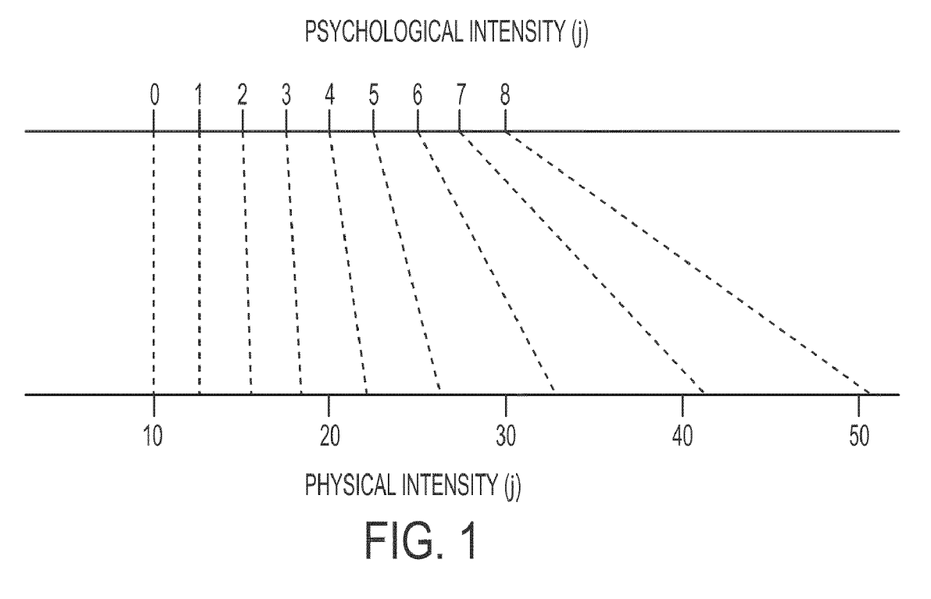
FIG. 1 illustrates a relationship between physical intensity and psychological intensity.

Gustav Theodor Fechner offered more experimental evidence to interpret Weber's Law that JND is not only the difference threshold, but also can be regarded as a unit of psychophysical magnitude. FIG. 1 illustrates the relationship between physical intensity and psychological intensity. As illustrated in FIG. 1, the proportion between the psychological intensity and physical intensity is constant, so it can be regarded as a measurement of psychological intensity. This relationship can be given by:

$$\frac{\Delta I_1}{I_1} = \frac{\Delta I_2}{I_2} = \ldots = \Delta \varphi = 1 JND. \quad (2)$$

According to Fechner's experimental results, the logarithm operation is used in Weber's Law to make the relationship between sensory experience and intensity of stimulus more obvious, i.e., $$S = k \log(I), \quad (3)$$

where S is the sensory experience, I is the intensity of the stimulus, and k is Weber's constant. This logarithm model is called the "Weber-Fechner Law", which is the first experimental JND model. The Weber-Fechner Law is easy to understand and use, however, follow-up research showed that this logarithm model is inflexible under many conditions.

Stevens proposed another JND model by adding and additional parameter $\alpha$ as follows:

$$S = kI^\alpha. \quad (4)$$

According to Fechner's experiments, the relationship between psychological intensity and physical intensity is logarithmic. Therefore, this model needs to take the logarithm of both sides, thus leading to:

$$\log S = \alpha \log I + \log k, \quad (5)$$

where S is the sensory experience, I is the intensity of the stimulus, k is constant, and $\alpha$ is used to control the slope of the response.

Different stimuli have different $\alpha$ values, for example 0.5 for point source brightness, 3.5 for electric shock, and 1 for thermal pain. Accordingly, using the parameter $\alpha$ makes this model more flexible. This is referred to as "Steven's Power Law". Further, more complicated JND models have been proposed for particular applications, including Bush-Hogging threshold curve and Campbell-Robson contrast sensitivity chart.

When JND is applied to image processing, the stimulus can be regarded as luminance and the difference of the stimulus can be regarded as the change of luminance in a small patch of the image, which can be represented as local contrast. Working with the Weber-Fechner's Law, the Weber contrast can be defined as:

$$C^W = \frac{\Delta L}{L}, \quad (6)$$

where L is the background luminance in a small patch of the image, and $\Delta L$ is the luminance change. The contrast, referred to as "Michelson's contrast", can be derived from $L_{min}$ and $L_{max}$, given by:

$$C^M = \frac{L_{max} - L_{min}}{L_{max} + L_{min}}. \quad (7)$$

Both Weber's contrast and Michelson's contrast are good indicators of perceived contrast for simple stimuli. However, when stimuli become more complex and the frequency range of an image becomes wider, these simple contrast measures fail to quantify the local contrast. To address this issue, a band-limited contrast, referred to as "Peli's contrast", can be given by:

$$C^P = \frac{\varphi * I(x, y)}{\phi * I(x, y)}, \quad (8)$$

where $\varphi$ is a band-pass filter, $\phi$ is a low-pass filter, and I is a given image.

Peli's contrast is very flexible by changing the filter kernel or designing a specific filter kernel to fit particular applications. Furthermore, Peli's contrast has good agreement with human perceptual experience.

A critical issue for no-reference image quality assessment is to determine what features are suitable for image quality assessment. The image features are used not only to quantify the image quality, but also to represent human perception. According to embodiments of the present invention, edge sharpness and noise level are the image features used to quantify image quality. According to the concept of JND described above, using these features in conjunction with contrast and background luminance weighting makes the image quality measurements consistent with human perception.

Figure 2:
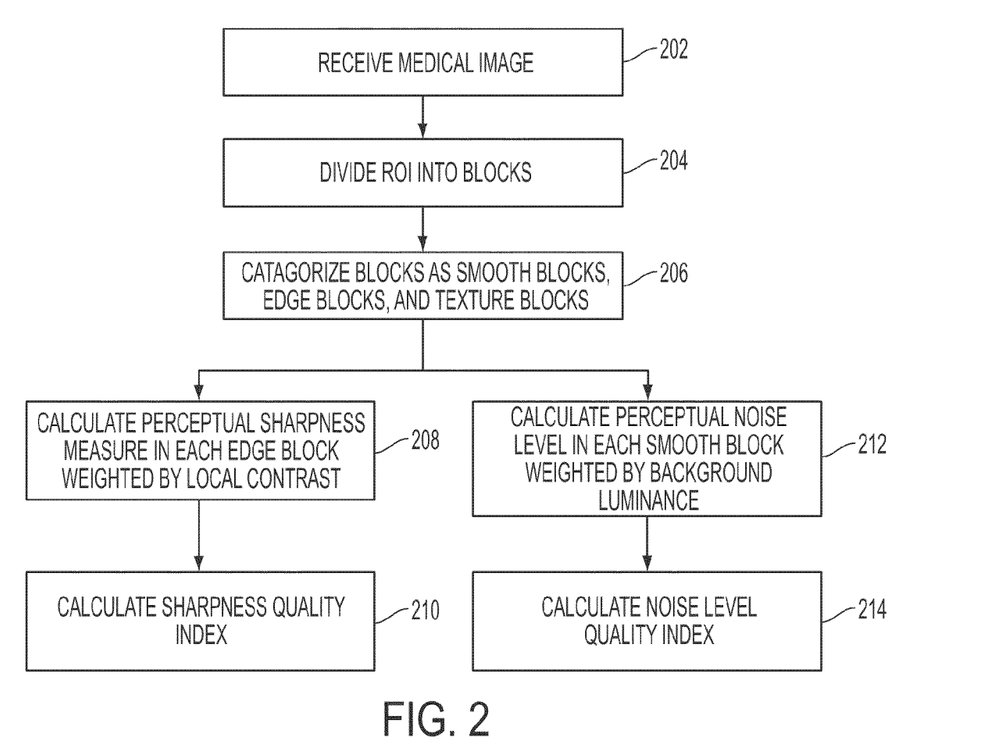
FIG. 2 illustrates a no-reference medical image quality assessment method according to an embodiment of the present invention.

FIG. 2 illustrates a no-reference medical image quality assessment method according to an embodiment of the present invention. The image quality assessment method of FIG. 2 is based on image analysis on local image patches rather pixels. Referring to FIG. 2, at step 202 a medical image is received. For example, the medical image can be an x-ray image. The medical image can be a compressed image that is received without the original image from which it was compressed. The medical image can be received directly from an image acquisition device, such as an x-ray imaging device, or the medical image can be received by loading the medical image, for example from a memory or storage of a computer device, or from a computer readable medium. A region of interest (ROI) can be defined in the medical image. The ROI is application dependent, and can be defined based on prior knowledge of a location of a particular structure in the image. For example, the ROI can be defined as a region surrounding a guide wire, catheter, or stent in the image. Defining the region of interest in the medical image is described in greater detail below. If there is not a defined ROI in the medical image, the ROI of the medical image can be considered the entire medical image.

At step 204, the ROI is evenly divided into non-overlapping blocks. For example, the ROI can be divided into 8×8 non-overlapping blocks.

Figure 3:
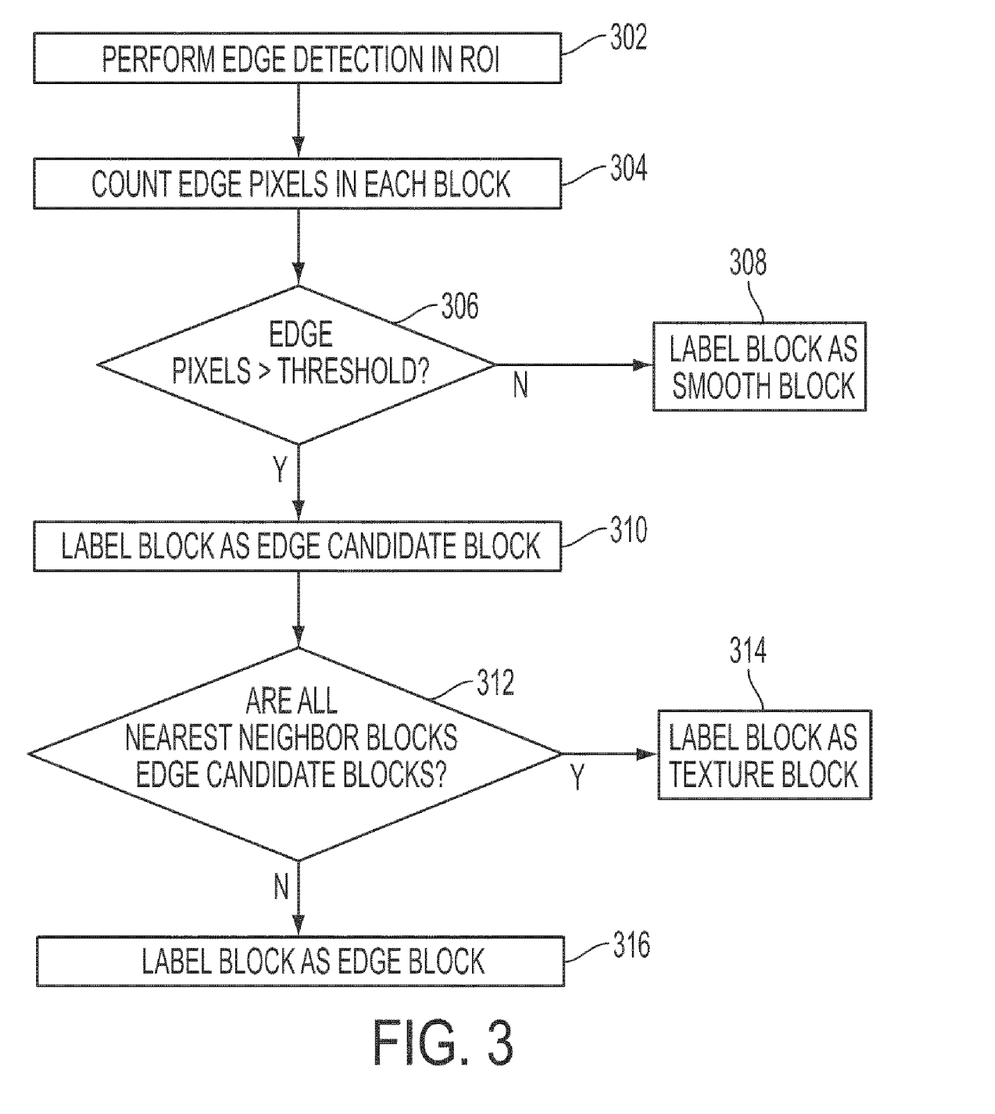
FIG. 3 illustrates a method for block categorization according to an embodiment of the present invention.

At step 206, the blocks are categorized as smooth blocks, edge blocks, and texture blocks. The blocks are categorized based on edge information generated in the ROI. FIG. 3 illustrates a method for block categorization according to an embodiment of the present invention. Accordingly, the method of FIG. 3 can be used to implement step 206 of the method of FIG. 2. As illustrated in FIG. 3, at step 302, edge detection is performed in the ROI of the medical image. For example, edge detection can be performed in the ROI using the well-known Canny edge detector or the well-known Sobel edge detector in order to generate edge information in the ROI.

At step 304, based on the edge information generated in step 302, the number of edge pixels is counted in each block. At step 306, it is determined for each block, whether the number of edge pixels in that block is greater than a threshold value. For example, in an advantageous implementation, the threshold value can be set to 5. At step 308, if the number of edge pixels in a block is not greater than the threshold value, the block is labeled as a smooth block. At step 310, if the number of edge pixels in a block is greater than the threshold value, the block is labeled as an edge candidate block.

At step 312, it is determined whether the nearest neighbor blocks to each edge candidate block are also edge candidate blocks. For edge candidate blocks, texture regions are excluded by checking the k-nearest neighbors around the edge candidate blocks. For example, in an advantageous implementation, k=8, such that for a particular edge candidate block, the 8 nearest neighbor blocks surrounding the edge candidate block are checked to determine whether all 8 of the nearest neighbor blocks are also edge candidate blocks. At step 314, if all of the nearest neighbors to an edge candidate block are also edge candidate blocks, the block is labeled as a texture block. At step 316, if any of the nearest neighbors to an edge candidate block is not an edge candidate block (i.e., is a smooth block), the block is labeled as an edge block.

Figure 4:
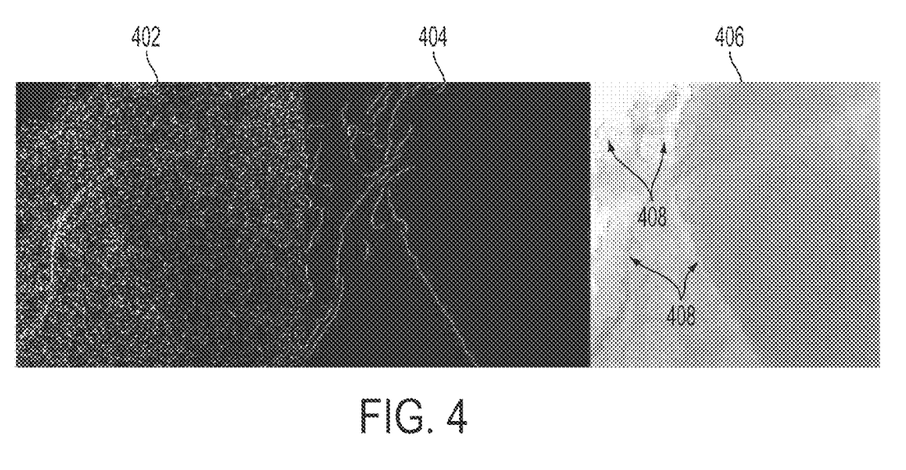
FIG. 4 illustrates exemplary edge blocks selected using the block categorization method of FIG. 3.

FIG. 4 illustrates exemplary edge blocks selected using the block categorization method of FIG. 3. As illustrated in FIG. 4, image 402 shows edge detection results in an x-ray image using the Sobel edge detector, which is very sensitive to noises in medical images. Image 404 shows edge detection results in the x-ray image using the Canny edge detector. Image 406 shows edge blocks 408 selected in the x-ray image using the block categorization method of FIG. 3.

Returning to FIG. 2, once the blocks are categorized as edge blocks, smooth blocks, and texture blocks, the edge blocks are used in steps 208 and 210 to calculate a sharpness quality index and the smooth blocks are used in steps 212 and 214 to calculate a noise level quality index. The texture blocks are not used in the image quality assessment method of FIG. 2. After the block categorization of step 206, the method of FIG. 2 proceeds down independent paths to steps 208 and 212. These paths can be performed simultaneously or in any order.

Figure 5:
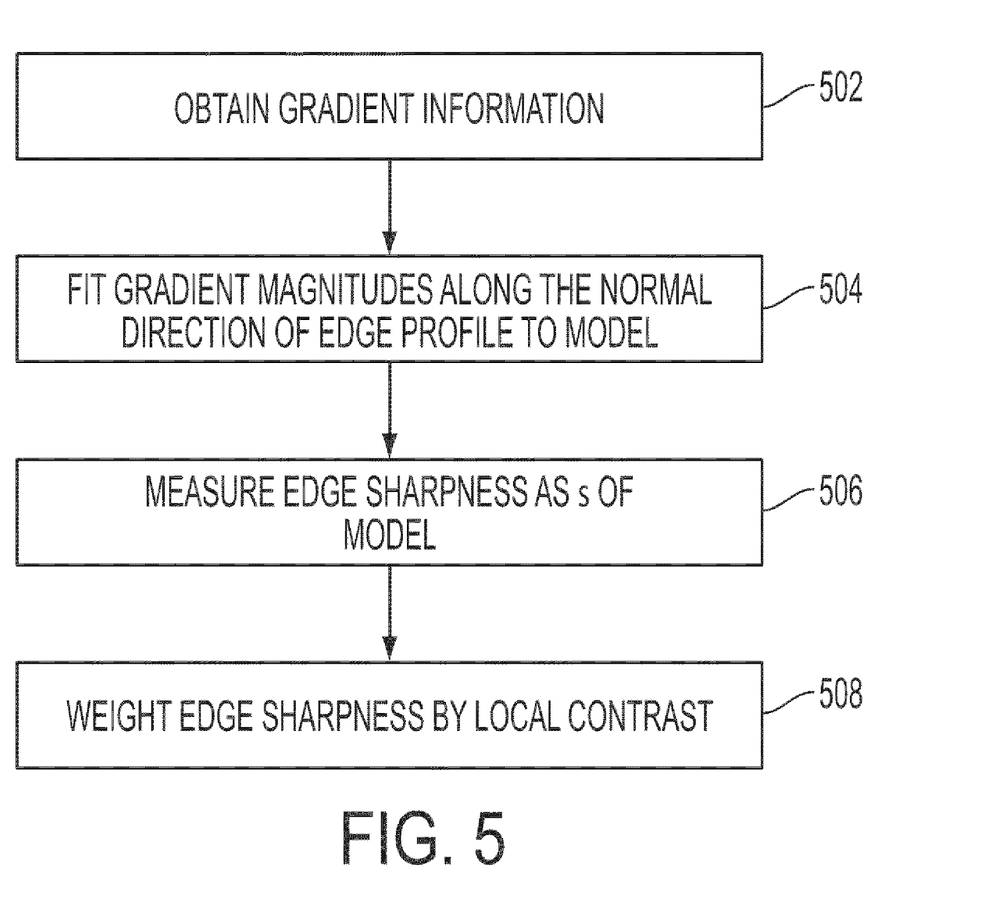
FIG. 5 illustrates a method for calculating a perceptual sharpness measure for an edge block according to an embodiment of the present invention.

At step 208, a perceptual sharpness measure is calculated in each edge block and weighted based on local contrast. The sharpness measure measures edge sharpness on structure edge pixels in an edge block. The sharpness measure for an edge block estimates the width of the edge in the edge block, and is weighted with the local contrast is order to reflect human perception. FIG. 5 illustrates a method for calculating a perceptual sharpness measure for an edge block according to an embodiment of the present invention. Accordingly, the method of FIG. 5 can be repeated for each edge block in order to implement step 208 of the method of FIG. 2. As illustrated in FIG. 5, at step 502, gradient information is obtained in the edge block. The gradient information can be obtained by performing edge detection, for example using a Sobel edge detector. If the Sobel edge detector is used to perform edge detection in the block categorization, the gradient information is available as a result of the previous edge detection. According to a possible implementation, edge detection in the block categorization can be performed using a Canny edge detector and edge detection for the sharpness measurement can be performed using a Sobel edge detector.

At step 504, gradient magnitudes at each edge point along a normal direction to the edge profile are fitted to a model. The gradient magnitudes may be fitted to a Gaussian model or a cumulative Gaussian function in order to model the edge profile for edge width estimations. A blurred impulse edge can be modeled by the Gaussian model and a blurred step edge can be modeled by the cumulative Gaussian function. For these two edge models, the standard deviation in the blurred edge model can be used to represent the edge width, i.e., the degree of blurring.

The image intensity for an impulse edge along the normal direction can be modeled by the following Gaussian model:

$$I(x) = \Delta I \cdot G(x; x_c, \sigma) + I_0, \tag{9}$$

where $I(x)$ is the image intensity function, $I_0$ is a constant, $x_c$ is an edge location, $\sigma$ is the spatial constant for the Gaussian function to indicate the edge width, and $$G(x; u, \sigma) = e^{-\frac{(x-u)^2}{2\sigma^2}}, \tag{10}$$

where $u$ and $\sigma$ are the mean and standard deviation of the Gaussian model, respectively. The standard deviation is used to represent the edge width of the blurred impulse edge, which can be determined by solving the following minimization problem:

$$\min_{I_0, \Delta I, \sigma} \sum_{x_c} |(\Delta I \cdot G(x_i; u, \sigma) + I_0) - I(x_i)|^2. \quad (11)$$

As for the blurred step edge, a similar approach can be used to estimate the edge width by modeling the profile of the blurred step edge with the cumulative Gaussian function:

$$I(x) = \Delta I \cdot erf(x; x_c, \sigma) + I_0, \quad (12)$$

where I(x) is the image intensity function, $I_0$ is a constant, $x_c$ is an edge pixel, σ is the spatial constant for the cumulative Gaussian function, and $$erf\left(\frac{x}{\sigma}\right) = \int_{-\infty}^{x} G(x) dx. \quad (13)$$

The standard deviation σ is used to represent the edge width of the blurred step edge, which can be calculated by solving the following minimization problem:

$$\min_{I_0, \Delta I, \sigma, x_c} \sum_{x_i} |(\Delta I \cdot erf(x_i; x_c, \sigma) + I_0) - I(x_i)|^2. \quad (14)$$

Each edge point of an edge block can be modeled by either the Gaussian function or the cumulative Gaussian function. According to an advantageous implementation, each edge point can be modeled by both the Gaussian function and the cumulative Gaussian function, the fitting error for both models can be calculated, and the model having the smaller fitting error for each edge point selected to model that edge point, with the associated spatial constant σ (standard deviation) used for the edge width estimation.

At step 506, the spatial constant σ, or standard deviation, of the model is used as the edge sharpness measure for the edge block. Accordingly, the estimated edge width for the edge block is used as the edge sharpness measure.

At step 508, the edge sharpness measure for the edge block is weighted by the local contrast in the edge block in order to calculate the perceptual sharpness measure that reflects human perception. The edge sharpness received by the human vision system will be influenced by local contrast. According to an embodiment of the present invention, Peli's contrast is used to calculate the local contrast that is used to weight the edge sharpness measure to calculate the perceptual edge sharpness measure. Peli's contrast is expressed in Equation (8) above. As described above Peli's contrast takes into account the JND concept in order to reflect human perception.

In order to calculate Peli's contrast for the edge block, a Gaussian filter can be used as a low-pass filter, and Gabor filters can be used as the band-pass filters. Gabor filters are selective band-pass filters that respond strongly to signals with a particular range of spatial frequencies and orientations. Gabor filters have been widely used in image processing and computer vision. The kernels of Gabor filters look like Fourier basis elements that are multiplied by Gaussians, and can be mathematically formulated as follows:

$$g_{\lambda, \theta, \varphi, \sigma, \gamma}(x, y) = \exp\left(-\frac{x'^2 + \gamma^2 y'^2}{2\sigma^2}\right) \cos\left(2\pi \frac{x'}{\lambda} + \varphi\right), \quad (15)$$

where x'=x cos θ+y sin θ and y'=−x sin θ+y cos θ, λ is the wavelength, θ is orientation, φ is phase offset, and γ is aspect ratio. In this equation, the parameter σ cannot be directly controlled, but is controlled by the choice of the parameters λ and bandwidth b. The relationship among λ, σ, and b can be expressed as:

$$\frac{\sigma}{\lambda} = \frac{1}{\pi} \sqrt{\frac{\ln 2}{2}} \cdot \frac{2^b + 1}{2^b - 1}. \quad (16)$$

The descriptions of these parameters and their biological ranges are summarized in Table 1, below.

TABLE 1

| | |
|---|---|
| Wavelength λ | specifies the wavelength of the cosine factor of the Gabor function. The wavelength is given in pixels. Valid values are real numbers between 2 and 256. |
| Orientation θ | specifies the orientation of the normal to the parallel stripes of the Gabor function. The orientation is specified in degrees. Valid values are real numbers between 0 and 180. |
| Phase offset φ | specifies the phase offset of the cosine factor of the Gabor function. It is specified in degrees. Valid values are real numbers between −180 and 180. The values 0 and 180 correspond to symmetric "centreon" and "centre-off" functions, respectively, while −90 and 90 correspond to antisymmetric functions. |
| Aspect ratio γ | specifies the ellipticity of the Gaussian factor. Values typical of the receptive fields of simple cells lie between 0.2 and 1. |
| Bandwidth b | specifies the spatial-frequency bandwidth of the filter when the Gabor function is used as a filter kernel. The bandwidth is specified in octaves. Values typical of the receptive fields of simple cells lie between 0.4 and 2.5. |

According to an advantageous implementation, the local contrast can be obtained by the maximal response of a Gabor filter over 6 different wavelengths and 8 different orientations, which can be formulated as follows:

$$v_{i,j} = \frac{\varphi_{i,j} \otimes B(x, y)}{\phi_i \otimes B(x, y)}, \quad (17)$$

$$C_b^P(x, y) = \max|v_{i,j}|, \quad j \in \left\{0, \frac{\pi}{4}, \frac{\pi}{3}, \frac{\pi}{2}, \frac{2\pi}{3}, \frac{3\pi}{4}, \frac{5\pi}{6}\right\} \quad i \in \{2, 4, 8, 16, 32, 64\} \quad (18)$$

where B(x,y) denotes the image function for the edge block centered at (x,y), λ is the wavelength, and θ is the orientation. The other parameters of the Gabor filter can beset as, γ=0.5 and b=1.11.

Figure 6:
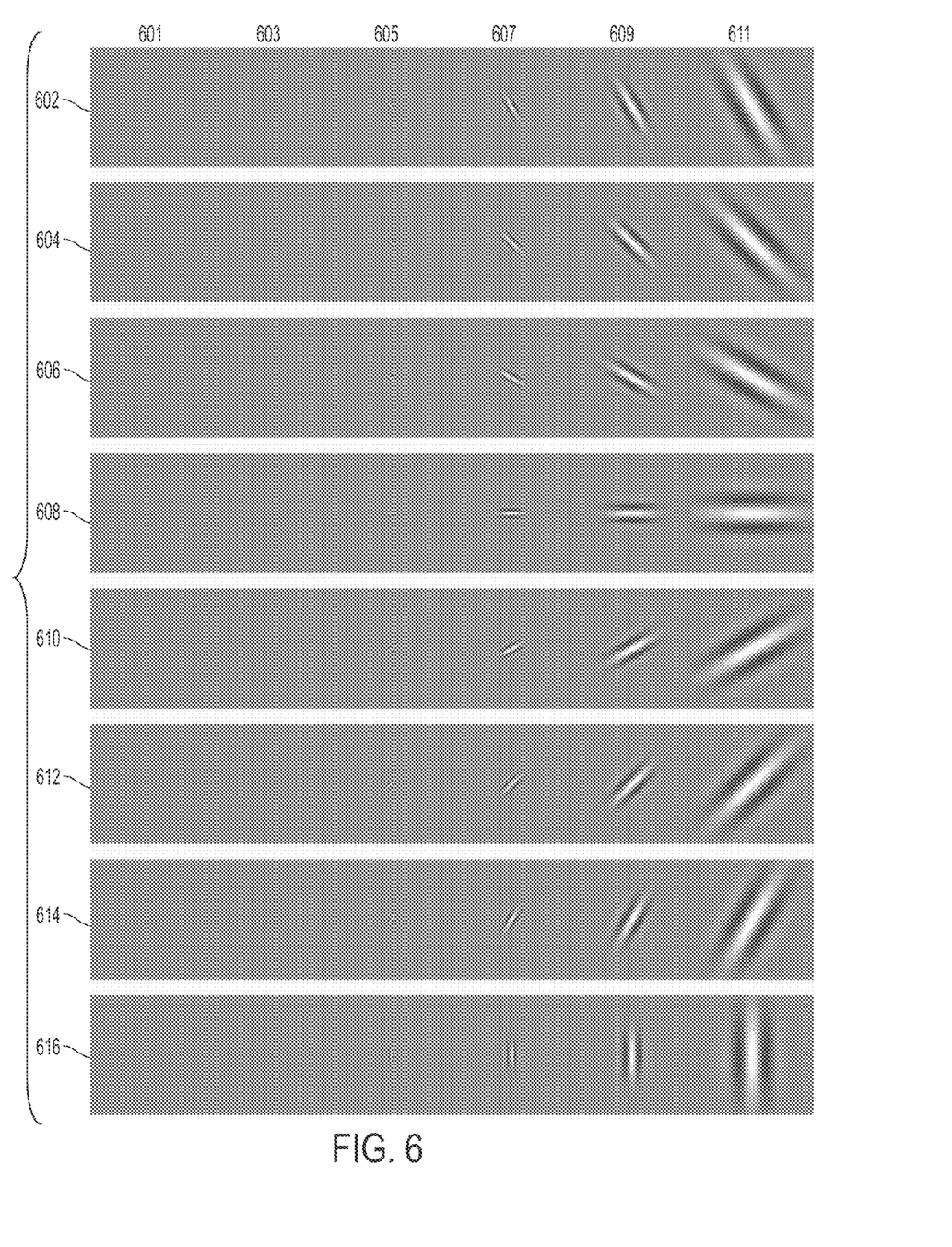
FIG. 6 illustrates Gabor filter kernels used to calculate Peli's contrast in an edge block.

FIG. 6 illustrates the Gabor filter kernels used to calculate Peli's contrast in an edge block. As illustrated in FIG. 6, each row 602, 604, 606, 608, 610, 612, 614, and 616 corresponds to a different orientation, and each column 601, 603, 605, 607, 609, and 611 corresponds to a different wavelength.

Once the local contrast information is calculated, the contrast value is used to weight the edge sharpness measure to calculate the perceptual sharpness measure. The contrast weighted perceptual sharpness measure for an edge block is given by:

$$\frac{\sigma_{edge\_model}(x, y)}{C_b^p(x, y)}, \quad (19)$$

where $\sigma_{edge\_model}(x,y)$ is the estimated edge width in the edge block centered at (x,y).

Returning to FIG. 2, once the perceptual sharpness measure is calculated for all of the edge blocks in the ROI, at step 210, a sharpness quality index is calculated based on the perceptual sharpness values for all of the edge blocks. The sharpness quality index is calculated by calculating the mean of all the contrast weighted perceptual edge sharpness measures from all of the edge blocks.

Figure 7:
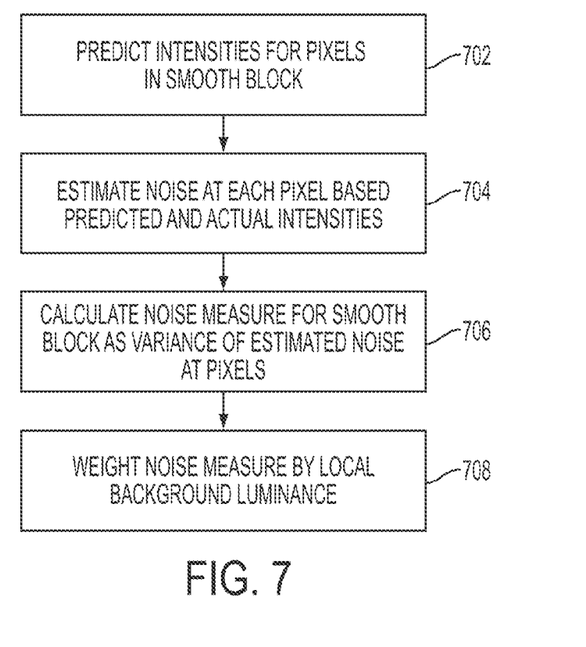
FIG. 7 illustrates a method for calculating a perceptual noise level measure for a smooth block according to an embodiment of the present invention.

At step 212, a perceptual noise level measure is calculated for each of the smooth blocks. The perceptual noise level measure is weighted by background luminance to reflect human perception. FIG. 7 illustrates a method for calculating a perceptual noise level measure for a smooth block according to an embodiment of the present invention. Accordingly, the method of FIG. 7 can be repeated for each smooth block in the ROI in order to implement step 212 of the method of FIG. 2.

As illustrated in FIG. 7, at step 702, the intensities of the pixels for a smooth block are predicted. For the pixels in the smooth block, it is assumed that the intensity at a pixel can be well approximated by a linear combination of its neighboring pixel intensities. This locally linear image prediction model is suitable for homogenous or smooth regions. Based on this assumption, the model prediction error can be used as a measure for noise. To obtain the locally linear prediction model, least-square estimation is used to obtain a linear prediction model for all of the pixels in a smooth block with a linear combination of the intensities of the k-nearest neighbors.

Denote the concatenation of the N-nearest neighbors of pixel (i,j) by a vector $N_{(i,j)}$. The local window centered at (i,j) is denoted as $M_{(i,j)}$ and its size is M. Let the concatenation of these M elements in $M_{(i,j)}$ be denoted by a vector $\bar{y}_{M(i,j)} = [y_1 \ldots y_M]^T$, and $C_{M \times N} = [\bar{c}_1 \ldots \bar{c}_M]^T$ be a matrix whose $k^{th}$ column vector is a vector of the form $N_{(i,j)}$ for the corresponding pixel $y_k$. The locally linear prediction model can be written as:

$$C\bar{a} = \bar{y}, \quad (20)$$

and this linear prediction problem can be solved by solving the minimization problem:

$$\min_{\bar{a}} \|C\bar{a} - \bar{y}\|^2. \quad (21)$$

At step 704, the noise at each pixel in the smooth block is estimated based on the predicted pixel intensities and the actual pixel intensities in the smooth block. In particular, the noise at each pixel is estimated as the prediction error, which is the difference between the predicted value and the actual intensity value. The prediction error at the pixel location (i,j) is given by:

$$\bar{a}^T N_{(i,j)} - y(i,j). \quad (22)$$

At step 706, a noise measure is calculated for the smooth block by calculating the variance of the estimated noise (i.e., prediction errors) for the pixels in the smooth block.

At step 708, the noise measure for the smooth block is weighted by the background luminance to calculate the perceptual noise level measure for the smooth block. The visibility threshold to differences in luminance tends to increase as the background luminance increases. Therefore, the objective noise level assessment is adjusted by the background luminance to accurately reflect human perception. Obtaining the background luminance in a smooth region, such as a smooth block, is easier than in an edge or texture region. The following weighted low-pass operator can be convoluted to obtain the average background luminance of the smooth block:

$$B_k = \begin{bmatrix} 1 & 1 & 1 & 1 & 1 \\ 1 & 2 & 2 & 2 & 1 \\ 1 & 2 & 0 & 2 & 1 \\ 1 & 2 & 2 & 2 & 1 \\ 1 & 1 & 1 & 1 & 1 \end{bmatrix}. \quad (23)$$

The background luminance is used to weight the noise measure estimated by local linear prediction in the smooth block in order to calculate the perceptual noise level measure in the smooth block.

Returning to FIG. 2, once the perceptual noise level measure is calculated for all of the smooth blocks in the ROI, at step 214, a noise level quality index is calculated based on the perceptual noise level values for all of the edge blocks. The noise level quality index is calculated by calculating the mean of all the background luminance weighted perceptual noise level measures from all of the smooth blocks.

As described above, the methods of FIGS. 2, 3, 5, and 7 are used to determine a sharpness quality index and a noise level quality index for an input medical image. The sharpness quality index and the noise level quality index are objective quantitative measures of the quality of the input medical image that accurately reflect human perception of quality. These quality indexes can be used in a variety of image processing procedures for assessing overall image quality of medical images. For example, theses quality indexes can be used in applications, such as video/image compression and storage in healthcare and homeland security, and band-width limited wireless communication. According to a possible embodiment of the present invention, the noise level quality index and the sharpness quality index can be combined, for example using machine learning of annotated sample images by human experts, to determine an overall quality index for medical image quality assessment. Accordingly, the sharpness quality index and the noise level quality index can be combined differently using machine learning for different tasks.

Figure 8:
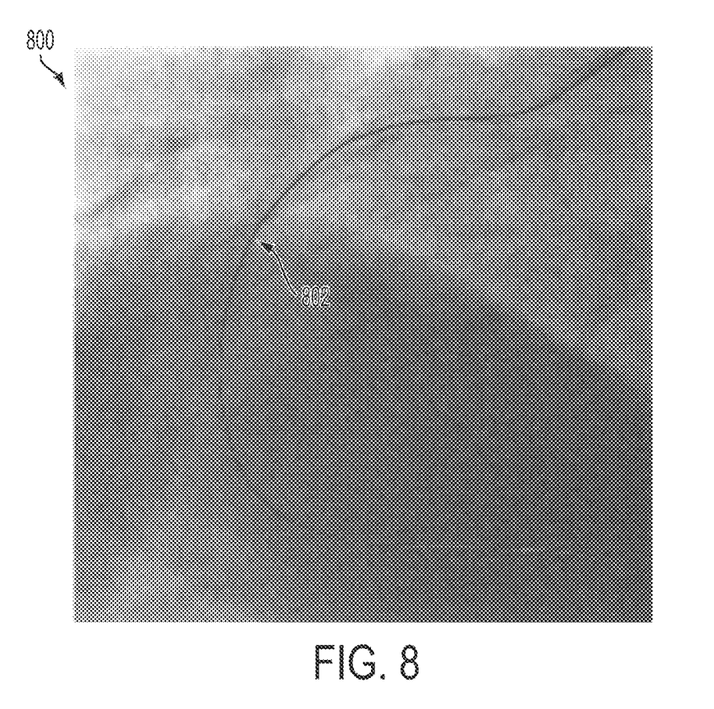
FIG. 8 illustrates an exemplary guide wire in a medical image.

As described above, the method of FIG. 2 can be used to assess the quality of a particular ROI in a medical image. This is important because in medical images, physicians may only be concerned about the quality of the region of an image that is related to the diagnosis. For example, a guide wire labeled by human experts can be the basis for defining a ROI. The guide wire is human labeled information which indicates the important portions of a medical image for diagnosis. These portions of the medical image may be the contour of an organ or the boundary of tissues or vessels. FIG. 8 illustrates an exemplary guide wire in a medical image. As illustrated in FIG. 8, image 800 is an x-ray image showing a human labeled guide wire 802. The guide wire 802 defines a ROI in the image 800 that contains the important diagnostic information.

As described above, when an ROI is defined in a medical image, the method of FIG. 2 can be performed particularly on the ROI in order to determine the sharpness quality index and noise level quality index for the ROI instead of for the entire medical image. Because a guide wire usually corresponds to edge pixels in medical images, it is related to edge block selection in the image quality assessment method. Accordingly, in an advantageous implementation of the image quality assessment method, if an ROI is defined by a human annotated guide wire, all edge candidate blocks covered by the guide wire are considered edge blocks and are used for calculating edge sharpness for the sharpness quality index. This modified method for edge block selection can increase the focus of the image quality assessment on the ROI defined by the guide wire, and make the image quality assessment method more flexible for medical diagnostic use with user interaction through a graphical user interface.

As described above, the method of FIG. 2 describes image quality assessment for a medical image. However, the method of FIG. 2 can be adapted to apply the image quality assessment method to a sequence of medical images in order to evaluate the quality of the sequence. Medical image sequences, such as x-ray image sequences, can be taken of a particular part of the human body to sequentially record the physiological response during a certain period of time. A guide wire may be seen as foreground in such an image sequence. The quality of the whole sequence can be assessed by measuring the changes in the guide wire region over the image sequence. This sequence image quality measure can be calculated by calculating gradient correlations between adjacent frames in the edge blocks covered by the labeled guide wire. However, considering deformation of the guide wire in the medical image sequence, the corresponding edge blocks may not always be found reliably in each frame. The motion for each guide wire edge block can be approximated by translation, so it is possible to search for corresponding edge blocks in each frame in a small region spatially. If a particular edge block appears in a previous frame, but the corresponding block is not found in the current frame, the block is labeled as a deformed block, and not used in the image quality assessment. For all edge blocks in successive frames that have corresponding blocks, normalized correlations between the image gradients in the corresponding edge blocks are calculated. Once the normalized correlations are calculated for all of edge blocks of the ROI other than the deformed blocks, the image sequence quality measure for the whole sequence is determined as the mean correlation of all of the selected edge blocks over all the frames, which is given by:

$$\frac{1}{N-1} \sum_{t=1}^{N-1} \frac{1}{M_t} \sum_{j=1}^{M_t} Cr\left(G_{(x_j^t, y_j^t)}^t, G_{(x_j^t + \Delta x_j^t, y_j^t + \Delta y_j^t)}^{t+1}\right), \quad (24)$$

where N is the total number of frames, $M_t$ is the total number of matched edge blocks in the t-th frame, $G_{(x,y)}^t$ is the local image gradient block centered at location (x,y), $(x_j^t, y_j^t)$ and $(\Delta x_j^t, \Delta y_j^t)$ are the center location and the translation vector of the j-th matched edge block in the t-th frame, respectively, and Cr is the normalized correlation function.

Figure 9A:
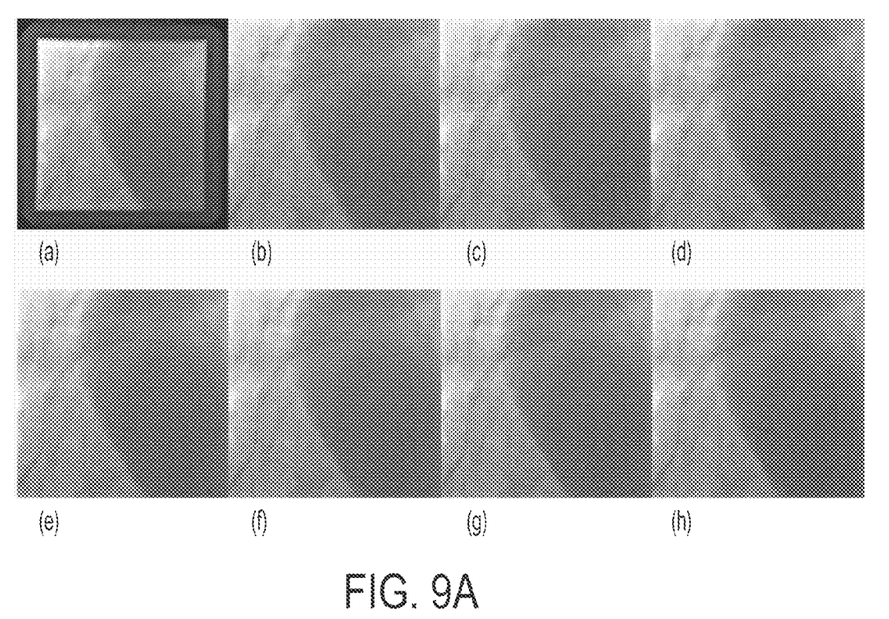
FIGS. 9A and 9B illustrate exemplary sharpness quality index results obtained using the method of FIG. 2.
Figure 9B:
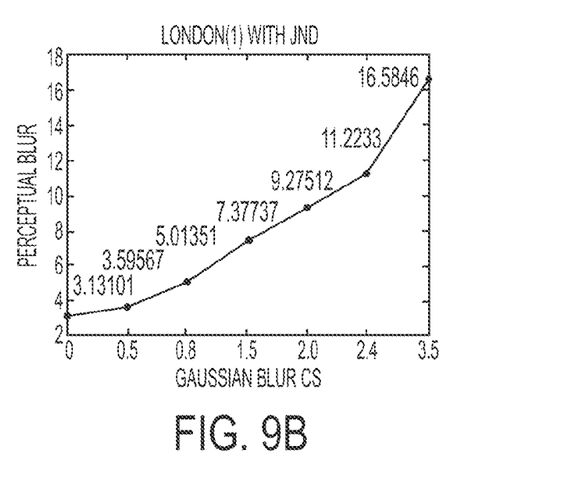

FIGS. 9A and 9B illustrate exemplary sharpness quality index results obtained using the method of FIG. 2. As illustrated in FIG. 9A, image (a) is an original x-ray image, image (b) is a corresponding cropped x-ray image without the boundary produced by the x-ray imaging device, and images (c)-(h) are testing images, generated from image (b) with increasing degrees of Gaussian blurring. FIG. 9B illustrates the sharpness quality index calculated for images (b)-(h). In the graph of FIG. 9B, the x-axis is the blur variance of the images, and the y-axis is the sharpness quality index calculated based on estimated edge widths weighted by local contrast, calculated as Peli's contrast.

Figure 10A:
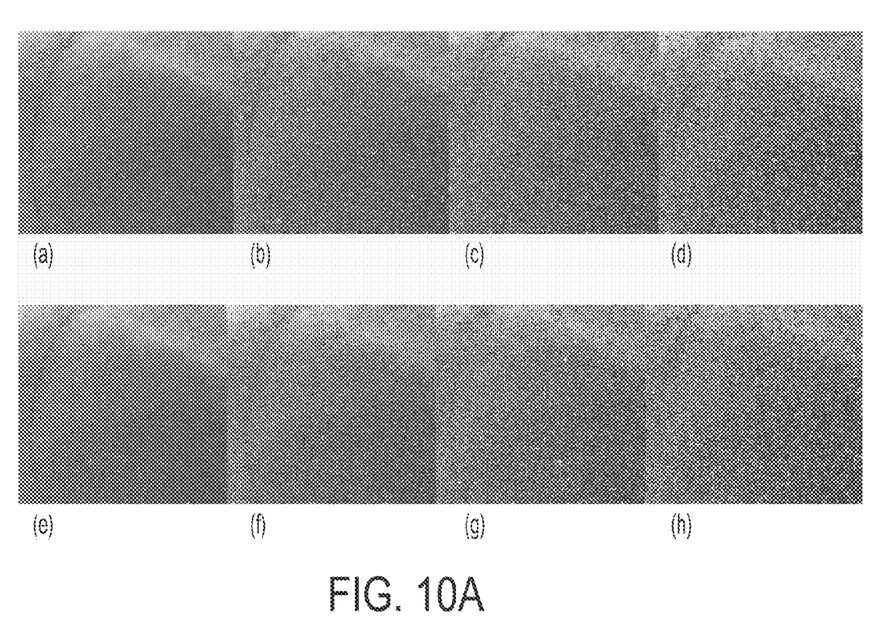
FIGS. 10A, 10B, and 10C illustrate exemplary noise level quality index results obtained using the method of FIG. 2.
Figure 10B:
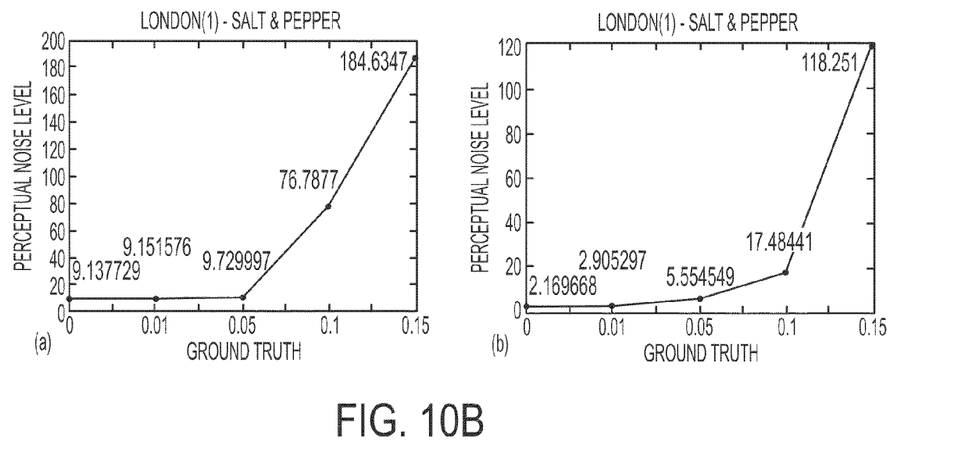
Figure 10C:
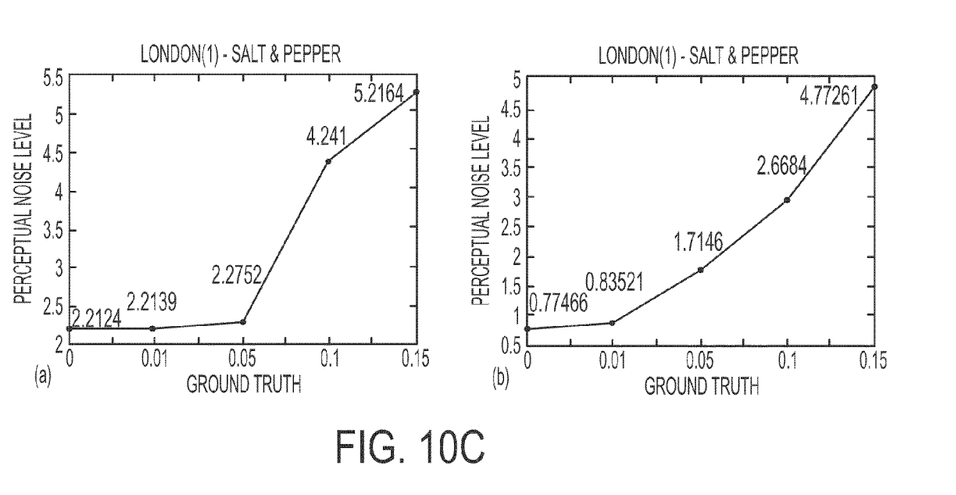

FIGS. 10A, 10B, and 10C illustrate exemplary noise level quality index results obtained using the method of FIG. 2. As illustrated in FIG. 10A, images (a)-(h) are testing images, generated with salt and pepper random noise. Images (a)-(d) are generated with Gaussian blur of σ=0.8, and with 1%, 5%, 10%, and 15% added salt and pepper noise, respectively. Images (e)-(h) are generated with Gaussian blur of σ=2.0, and with 1%, 5%, 10%, and 15% added salt and pepper noise, respectively. FIG. 10B illustrates the noise level quality index calculated for images (a)-(h). As illustrated in FIG. 10B, graph 1002 shows the noise level quality index of images (a)-(d), with the percentage of added noise as the x-axis and the noise level quality index as the y-axis. Graph 1004 shows the noise level quality index of images (e)-(h), with the percentage of added noise as the x-axis and the noise level quality index as the y-axis. As illustrated in FIG. 10C, graphs 1006 and 1008 show the logarithm representation of the noise level quality indexes shown in graphs 1002 and 1004, respectively. The logarithm noise level measure represents the relationship between stimulus and sensory experience. Moreover, the range of the logarithm representation may be advantageous in combining the noise level quality index with the sharpness quality index.

Figure 11:
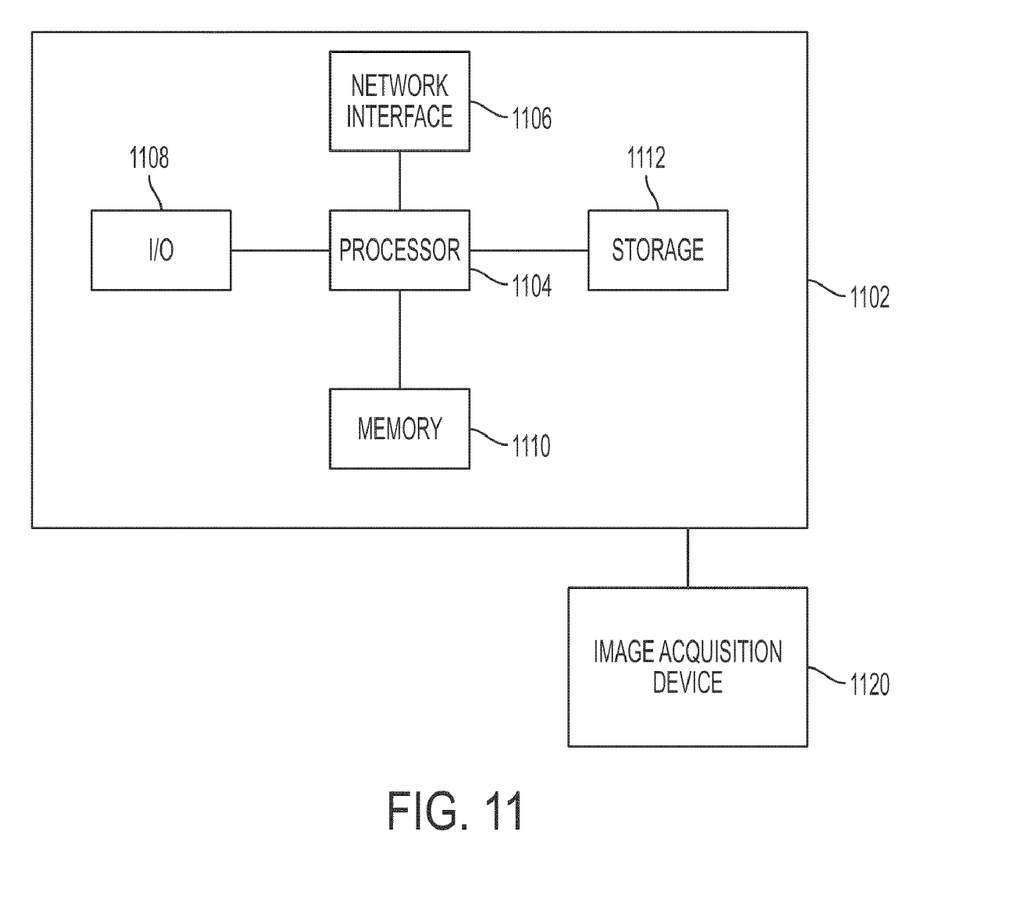
FIG. 11 is a high level block diagram of a computer capable of implementing the present invention.

The above-described methods for no-reference medical image quality assessment may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112 (e.g., magnetic disk) and loaded into memory 1110 when execution of the computer program instructions is desired. Thus, the method steps of FIGS. 2, 3, 5, and 7 can be defined by the computer program instructions stored in the memory 1110 and/or storage 1112 and controlled by the processor 1104 executing the computer program instructions. For example, the computer program instructions can be implemented as computer executable code programmed by one skilled in the art to perform an algorithm defined by the method steps of FIGS. 2, 3, 5, and 7. Accordingly, by executing the computer program instructions, the processor 1104 executes an algorithm defined by the method steps of FIGS. 2, 3, 5, and 7. An image acquisition device 1120, such as an x-ray imaging device, can be connected to the computer 1102 to input medical images to the computer 1102. It is possible to implement the image acquisition device 1120 and the computer 1102 as one device. It is also possible that the image acquisition device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus for no-reference medical image quality assessment comprising:
    means for dividing a region of interest (ROI) in a medical image into a plurality of blocks;
    means for categorizing each block in the plurality of blocks as one of a smooth block, a texture block, and an edge block;
    means for calculating a perceptual sharpness measure in each edge block, the perceptual sharpness measure weighted by local contrast in each edge block;
    means for calculating a perceptual noise level measure in each smooth block, the perceptual noise level measure weighted by background luminance in each smooth block;
    means for determining a sharpness quality index based on the perceptual sharpness measures in the edge blocks; and
    means for determining a noise level quality index based on the perceptual noise level measures in the smooth blocks.

2. The apparatus of claim 1, wherein said means for categorizing each block in the plurality of blocks as one of a smooth block, a texture block, and an edge block comprises:
    means for detecting edge information in the ROI of the medical image;
    means for counting a number of edge pixels in each block of the plurality of blocks;
    means for labeling the block as a smooth block if the number of edge pixels in a block is less than a threshold;
    means for labeling the block as an edge candidate block if the number of edge pixels in a block is greater than the threshold;
    means for determining, for each edge candidate block, whether all of a number of nearest neighbor blocks are edge candidate blocks;
    means for labeling an edge candidate block as a texture block if all of the number of nearest neighbor blocks are edge candidate blocks; and
    means for labeling an edge candidate block as an edge block if any of the number of nearest neighbor blocks is not an edge candidate block.

3. The apparatus of claim 1, wherein said means for calculating a perceptual sharpness measure in each edge block, the perceptual sharpness measure weighted by local contrast in each edge block comprises:
    means for obtaining gradient information in each edge block;
    means for modeling an edge profile in each edge block by fitting gradient magnitudes along a normal direction to the edge profile to one of a Gaussian function and a cumulative Gaussian function;
    means for estimating a width of the edge profile in each edge block as a standard deviation of the one of a Gaussian function and a cumulative Gaussian function used to model the edge profile; and
    means for weighting the estimated width of the edge profile in each edge block with the local contrast in that edge block, the local contrast calculated as Peli's contrast in each edge block.

4. The apparatus of claim 3, wherein said means for weighting the estimated width of the edge profile in each edge block with the local contrast in that edge block, comprises:
    means for calculating the local contrast in each edge block using Peli's contrast, with a Gaussian low-pass filter and a Gabor band-pass filter over a plurality of different wavelengths and orientations; and
    means for dividing the estimated width of the edge profile in each edge block by the local contrast calculated for that edge block.

5. The apparatus of claim 1, wherein said means for calculating a perceptual noise level measure in each smooth block, the perceptual noise level measure weighted by background luminance in each smooth block comprises:
    means for predicting intensities of pixels in each smooth block based on a locally linear prediction model;
    means for estimating noise in each smooth block by calculating the differences between the predicted intensities and actual intensities of the pixels in each smooth block; and
    means for calculating background luminance in each smooth block; and
    means for weighting the estimated noise in each smooth block by the background luminance calculated in each smooth block.

6. The apparatus of claim 1, wherein said means for determining a sharpness quality index based on the perceptual sharpness measures in the edge blocks comprises:
    means for calculating a mean of the perceptual sharpness measures of all of the edge blocks.

7. The apparatus of claim 1, wherein said means for determining a noise level quality index based on the perceptual noise level measures in the smooth blocks comprises:
    means for calculating a mean of the perceptual noise level measures of all of the smooth blocks.

8. A computer readable medium encoded with computer executable instructions for no-reference medical image quality assessment, the computer executable instructions defining steps comprising:
    dividing a region of interest (ROI) in a medical image into a plurality of blocks;
    categorizing each block in the plurality of blocks as one of a smooth block, a texture block, and an edge block;
    calculating a perceptual sharpness measure in each edge block, the perceptual sharpness measure weighted by local contrast in each edge block;
    calculating a perceptual noise level measure in each smooth block, the perceptual noise level measure weighted by background luminance in each smooth block;
    determining a sharpness quality index based on the perceptual sharpness measures in the edge blocks; and
    determining a noise level quality index based on the perceptual noise level measures in the smooth blocks.

9. The computer readable medium of claim 8, wherein the computer executable instructions defining the step of dividing a ROI in a medical image into a plurality of blocks comprise computer executable instructions defining the step of:
    dividing the ROI into a plurality of non-overlapping blocks of a predetermined size.

10. The computer readable medium of claim 8, wherein the computer executable instructions defining the step of categorizing each block in the plurality of blocks as one of a smooth block, a texture block, and an edge block comprise computer executable instructions defining the steps of:
- detecting edge information in the ROI of the medical image;
- counting a number of edge pixels in each block of the plurality of blocks;
- if the number of edge pixels in a block is less than a threshold, labeling the block as a smooth block;
- if the number of edge pixels in a block is greater than the threshold labeling the block as an edge candidate block;
- determining, for each edge candidate block, whether all of a number of nearest neighbor blocks are edge candidate blocks;
- if, for an edge candidate block, all of the number of nearest neighbor blocks are edge candidate blocks, labeling the edge candidate block as a texture block; and
- if, for an edge candidate block, any of the number of nearest neighbor blocks is not an edge candidate block, labeling the edge candidate block as an edge block.

11. The computer readable medium of claim 8, wherein the computer executable instructions defining the step of calculating a perceptual sharpness measure in each edge block, the perceptual sharpness measure weighted by local contrast in each edge block comprise computer executable instructions defining the steps of:
- obtaining gradient information in each edge block;
- modeling an edge profile in each edge block by fitting gradient magnitudes along a normal direction to the edge profile to one of a Gaussian function and a cumulative Gaussian function;
- estimating a width of the edge profile in each edge block as a standard deviation of the one of a Gaussian function and a cumulative Gaussian function used to model the edge profile; and
- weighting the estimated width of the edge profile in each edge block with the local contrast in that edge block, the local contrast calculated as Peli's contrast in each edge block.

12. The computer readable medium of claim 11, wherein the computer executable instructions defining the step of weighting the estimated width of the edge profile in each edge block with the local contrast in that edge block, comprise computer executable instructions defining the steps of:
- calculating the local contrast in each edge block using Peli's contrast, with a Gaussian low-pass filter and a Gabor band-pass filter over a plurality of different wavelengths and orientations; and
- dividing the estimated width of the edge profile in each edge block by the local contrast calculated for that edge block.

13. The computer readable medium of claim 8, wherein the computer executable instructions defining the step of calculating a perceptual noise level measure in each smooth block, the perceptual noise level measure weighted by background luminance in each smooth block comprise computer executable instructions defining the steps of:
- predicting intensities of pixels in each smooth block based on a locally linear prediction model;
- estimating noise in each smooth block by calculating the differences between the predicted intensities and actual intensities of the pixels in each smooth block; and
- calculating background luminance in each smooth block; and
- weighting the estimated noise in each smooth block by the background luminance calculated in each smooth block.

14. The computer readable medium of claim 8, wherein the computer executable instructions defining the step of determining a sharpness quality index based on the perceptual sharpness measures in the edge blocks comprise computer executable instructions defining the step of:
- calculating a mean of the perceptual sharpness measures of all of the edge blocks.

15. The computer readable medium of claim 8, wherein the computer executable instructions defining the step of determining a noise level quality index based on the perceptual noise level measures in the smooth blocks comprise computer executable instructions defining the step of:
- calculating a mean of the perceptual noise level measures of all of the smooth blocks.

* * * * *